(No Model.)
J. L. BOTTORFF & C. A. CONYERS.
CORN CULTIVATOR.
No. 442,946.
Patented Dec. 16, 1890.
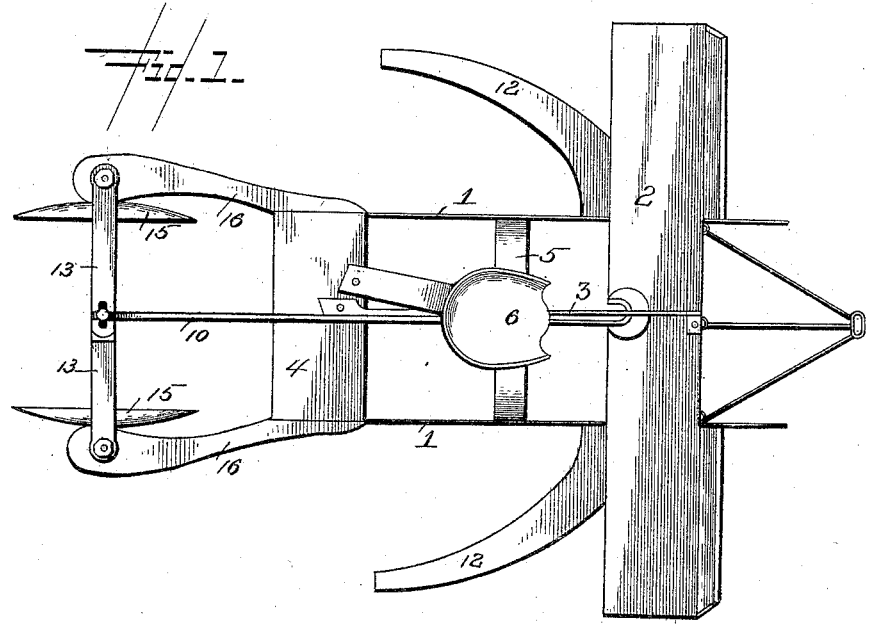
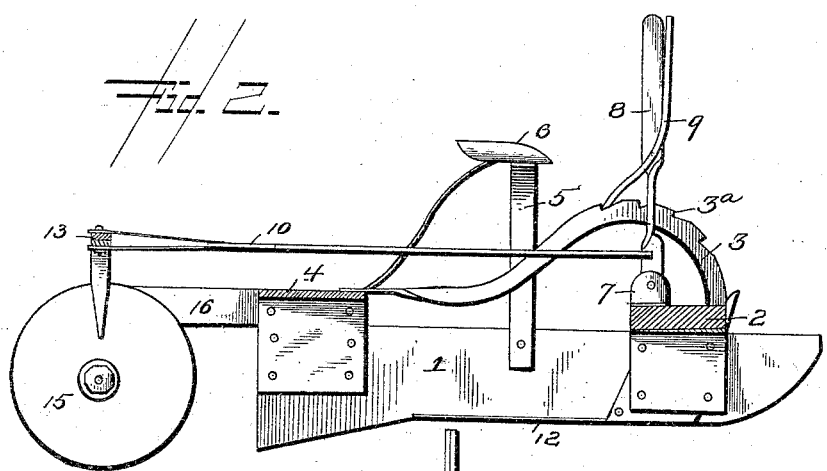
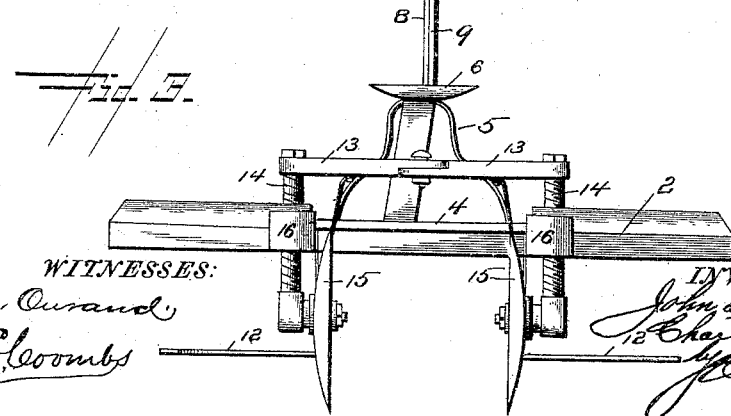
WITNESSES:
INVENTOR

UNITED STATES PATENT OFFICE.

JOHN L. BOTTORFF AND CHARLEY A. CONYERS, OF UNION STAR, MISSOURI.

CORN-CULTIVATOR.

SPECIFICATION forming part of Letters Patent No. 442,946, dated December 16, 1890.

Application filed July 29, 1890. Serial No. 360,256. (No model.)

*To all whom it may concern:*

Be it known that we, JOHN L. BOTTORFF and CHARLEY A. CONYERS, both residents of Union Star, in the county of DeKalb and State of Missouri, have invented certain new and useful Improvements in Corn-Cultivators; and we do hereby declare that the following is a full, clear, and exact description of the invention, which will enable others skilled in the art to which it appertains to make and use the same, reference being had to the accompanying drawings, which form a part of this specification.

Our invention relates to improvements in corn-cultivators, the object being to provide a cheap, simple, and effective apparatus for cutting or destroying the weeds and other injurious growth between the rows and turning over the soil upon the growing corn in such quantities as may be desired.

The invention consists in the novel features of construction and new combinations of parts, hereinafter fully described, and definitely pointed out in the claim.

In the accompanying drawings, Figure 1 represents a plan view of a corn-cultivator constructed in accordance with our invention. Fig. 2 is a central sectional view of the same. Fig. 3 is an end view.

In the said drawings, the reference-numeral 1 designates the side pieces of the improved cultivator composed of metal bars having their fronts and bottoms formed with cutting-edges.

2 designates the front cross-bar connecting the front end of said side pieces, and to which the whiffletree or other devices which connect with the harness of the draft-animals are connected. Secured to this plate or bar 2 is a segment 3, having rack-teeth 3ª, the rear end of said segment being connected with rear connecting-bar 4.

Intermediate of the cross pieces or bars 2 and 4 and supported by uprights 5 is the driver's seat 6, and pivoted in lugs 7 on the front connecting-piece is a lever 8 within convenient reach of the driver, provided with a pivoted pawl 9, which engages with the teeth in the said segment, said lever being connected by means of bar or rod 10 with the earth-turning disks, hereinafter described. At the forward ends of the side pieces 1 are formed or provided the outwardly-extending curved cutting knives or blades 12, which serve to cut the weeds between the rows of corn. Secured to the rear connecting piece or bar 4 and projecting rearwardly are two arms 16, having screw-threaded apertures at their rear ends, within which work the screw-threaded vertical rods or standards 14, carrying at their lower ends inwardly-turned lugs, upon which are pivotally secured the rotary disks 15. These disks are made of metal and concavo-convex in form, the concave portions facing each other. At their upper ends the standards 14 are provided with rigid inwardly-projecting arms 13, connected together at their inner ends and pivotally connected with the rod 10. The rods or standards 14 are vertically adjustable in the arms 16, so as to regulate the height of the disks.

The operation will be readily understood. The apparatus is designed to straddle the rows of corn with the knives or blades and disks on each side of the same, and when drawn over the field said knives or blades will cut the weeds between the rows, while the disks will turn the earth upon the rows. These disks can be oscillated or inclined so as to turn up the earth more or less, according to requirements, by means of the lever 8, connecting-rod 10, arms 16, and rods 14, which are oscillated to vary such inclination.

Having thus described our invention, what we claim is—

In a corn-cultivator, the combination, with the side pieces 1 and front and rear connecting-pieces, of the curved cutting-blades 12, the segment 3, with teeth 3ª, the lever 8, having pawl 9, the rearwardly-extending arms 16, having screw-threaded apertures, the vertically-adjustable rotary rods 14, carrying at their lower ends the concavo-convex disks 15 and at their upper ends the inwardly-projecting arms 13, and the rod 10, connecting said arms with the lever 8, substantially as described.

In testimony that we claim the foregoing as our own we have hereunto affixed our signatures in presence of two witnesses.

JOHN L. BOTTORFF.
CHARLEY A. CONYERS.

Witnesses:
SOLOMON WISE,
JONATHAN P. EADES.